United States Patent [19]
Lai

[11] Patent Number: 5,329,224
[45] Date of Patent: Jul. 12, 1994

[54] AUTOMOTIVE VOLTAGE REGULATOR CIRCUIT INCLUDING SERIAL VOLTAGE REGULATORS

[75] Inventor: Henry Lai, Bloomfield, Mich.

[73] Assignee: Ford Motor Company, Dearborn, Mich.

[21] Appl. No.: 138,107

[22] Filed: Oct. 20, 1993

[51] Int. Cl.$^5$ ............................ G05F 1/40; B60L 1/00
[52] U.S. Cl. .................................... 323/270; 307/10.1
[58] Field of Search ............... 323/267, 268, 269, 270, 323/273, 350, 902; 307/10.1, 58, 82

[56] References Cited

U.S. PATENT DOCUMENTS

| | | | |
|---|---|---|---|
| 3,600,667 | 8/1971 | Wynn | 323/22 T |
| 4,074,182 | 2/1978 | Weischedel | 323/25 |
| 4,445,083 | 8/1984 | Defalco | 323/273 |
| 4,535,282 | 8/1985 | Nguyen | 323/269 |
| 4,611,162 | 9/1986 | Erratico et al. | 323/269 |
| 5,068,592 | 11/1991 | Leonard et al. | 323/270 |
| 5,083,276 | 1/1992 | Okano et al. | 307/10.1 |
| 5,283,472 | 2/1994 | Takeuchi et al. | 307/10.1 |

FOREIGN PATENT DOCUMENTS 3105369  12/1982  Fed. Rep. of Germany ...... 323/270
57-34217  2/1982  Japan ................................... 323/270

OTHER PUBLICATIONS

"High Efficiency Linear Regulators", by Jim Williams, Linear Technology, Application Note 32, Mar. 1989, 9 pp.

"6-Pin DIP Optoisolators; Transistor Output", Motorola Semiconductor Technical Data, pp. 6-14 through 6-17.

"LM78XX Series Voltage Regulators", National Semiconductor, pp. 1-271 through 1-273.

Primary Examiner—Steven L. Stephan
Assistant Examiner—Matthew Nguyen
Attorney, Agent, or Firm—Roger L. May; Mark L. Mollon

[57] ABSTRACT

An automotive voltage regulator circuit for supplying a predetermined voltage to first and second optically connected and electrically separated digital electronic circuits includes first and second serially connected voltage regulators. The total drop-off voltage is reduced and the total current consumption is smaller for the two serially connected regulators as compared with two parallel circuits. Consequently, the total power consumption is reduced.

3 Claims, 1 Drawing Sheet

AUTOMOTIVE VOLTAGE REGULATOR CIRCUIT INCLUDING SERIAL VOLTAGE REGULATORS

TECHNICAL FIELD

This invention relates to voltage regulator circuits and, in particular, to voltage regulator circuits for supplying a predetermined voltage to automotive electronic circuits.

BACKGROUND ART

More and more digital circuits are being employed in automotive electronics such as automotive audio electronics. Consequently, there is a need for a relatively constant 5 volt voltage supply.

For audio products, the more efficient switching power supplies create undesirable side effects such as increased electromagnetic interference (EMI). EMI impairs radio reception. Consequently, linear-type voltage regulators have advantages over switching-type voltage regulators. Linear regulators have less EMI radiations, but they are also less efficient as described in Application Note 32 of Linear Technology Company.

Linear voltage regulators require the use of a large heat sink to dissipate wasted power from the voltage regulator. The wasted power primarily comes from the difference between input and output potentials resulting from instantaneous current requirements of the load. Such a large heat sink increases the volume and weight of the product. Therefore, it is desirable to have a voltage regulator circuit that is more efficient but that produces less EMI than prior art voltage regulator circuits.

German patent document 3 105 369 discloses a DC voltage regulator having two integrated circuit regulators connected in series between a load and a DC supply.

U.S. Pat. Nos. 3,600,667, 4,535,282, 4,074,182 and 4,611,162 all generally disclose voltage regulator circuits having two regulators. In addition, Japanese patent document 57-34217 discloses a similar-type circuit.

SUMMARY OF THE INVENTION

An object of the present invention is to provide a voltage regulator circuit for an automotive vehicle that is more efficient but that produces less EMI than the prior art voltage regulator circuits.

In carrying out the above object and other objects of the present invention, a voltage regulator circuit is provided for use in an automotive vehicle having a battery. The circuit is provided for supplying a predetermined voltage to first and second optically connected and electrically separated digital electronic circuits. The voltage regulator circuit includes a first linear regulator having input, output and ground terminals. The input terminal is adapted to be connected to the battery. The ground terminal provides a ground for the first electronic circuit and the output terminal is adapted for connection to the first electronic circuit for supplying the predetermined voltage to the first electronic circuit. The voltage regulator circuit also includes a second linear regulator having input, output and ground terminals. The input terminal of the second linear regulator is serially connected to the ground terminal of the first linear regulator. The ground terminal of the second linear regulator provides a ground for the second electronic circuit and a return for the battery. The output terminal of the second linear regulator is adapted to be connected to the second electronic circuit for supplying the predetermined voltage to the second electronic circuit.

Preferably, the first and second electronic circuits have substantially the same load impedance.

Also preferably, the voltage regulator circuit further includes a plurality of filters. One of the filters is connected between the input and ground terminals of each of the linear regulators. One of the plurality of filters is also connected between the ground and output terminals of each of the linear regulators.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
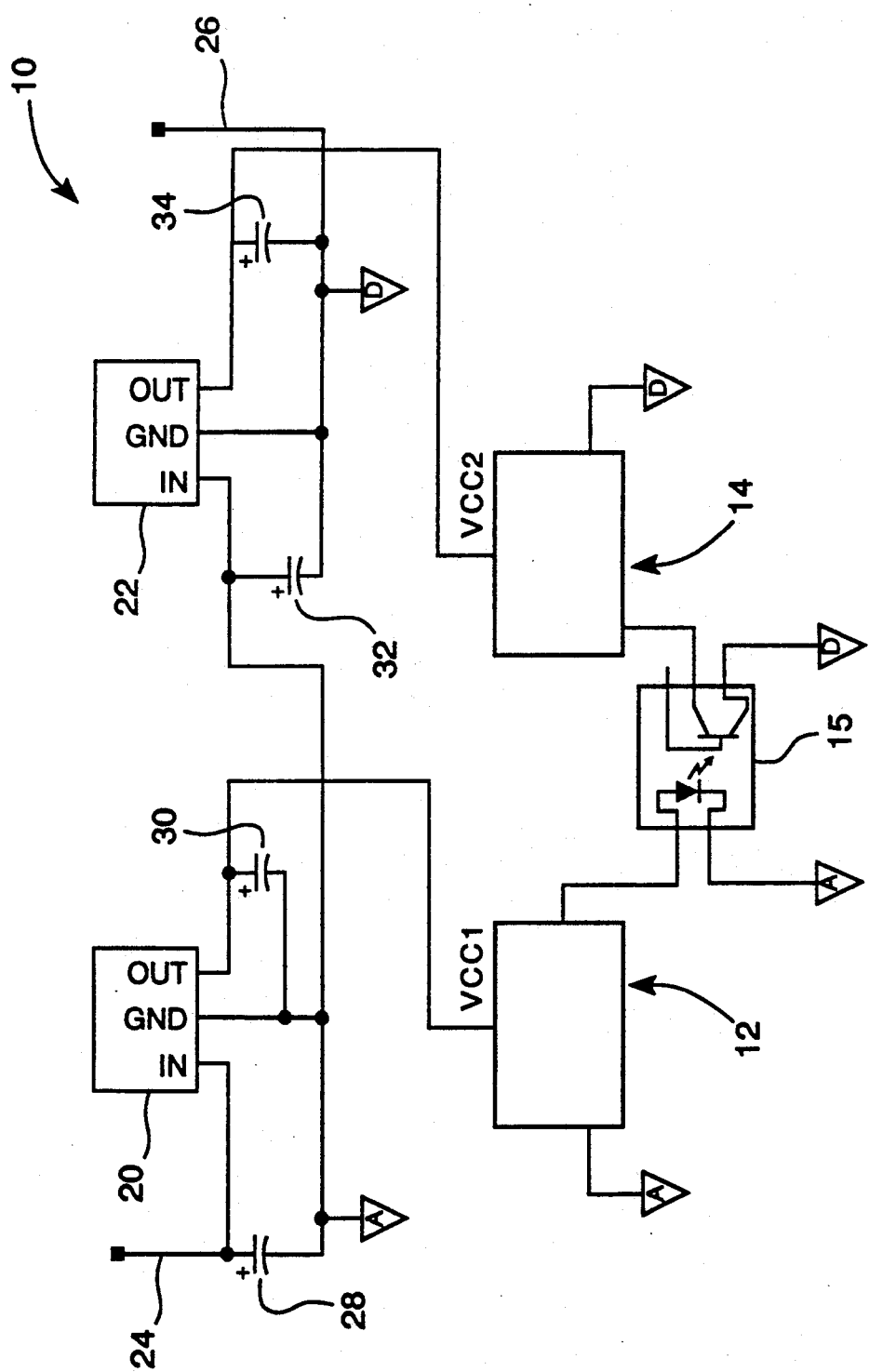
FIG. 1 is a schematic diagram of a voltage regulator circuit constructed in accordance with the present invention.

In general, the present invention relates to a voltage regulator circuit for use in an automotive vehicle having a battery. The invention is based on the premise that a relatively large digital circuit can be separated into two smaller digital electronic circuits. The voltage regulator circuit includes two serially connected power regulators in order to reduce power consumption.

The vehicle battery is assumed to be a 14 volt battery and the two voltage regulators are two 5 volt linear regulators which are connected in series. In this way, the total drop-off voltage can be reduced. Also, the total current consumption is smaller for two serial circuits as compared with two parallel circuits. In this way, the total power consumption is reduced.

Referring now to the drawing Figures, there is illustrated in FIG. 1, a voltage regulator circuit, generally indicated at 10, constructed in accordance with the present invention. The voltage regulator circuit 10 is adapted to supply a predetermined voltage such as 5 volts to first and second optically connected, yet electrically separated, digital electronic circuits generally indicated at 12 and 14, respectively. Preferably, the first circuit 12 communicates with the second circuit 14 only through a serial bus having three or four wires. Furthermore, the first circuit 12 and the second circuit 14 are connected optically through one or more optoisolator integrated circuits such as an optoisolator circuit 15. The optoisolator 15 provides the mechanism by which the first electronic circuit 12 communicates with the second electronic circuit 14. The circuit 15 preferably comprises a six pin DIP optoisolator having a transistor output, made by Motorola Semiconductor and having part number 4N38.

For illustration purposes, assume that the first and second electronic circuits 12 and 14 have an identical load impedance, R. If the current flows serially through the first and second electronic circuits 12 and 14, the total impedance is 2R.

The voltage regulator circuit 10 includes first and second series voltage regulators 20 and 22, respectively. The regulators 20 and 22 are commercially available from National Semiconductor Company and have the part number LM7805C. Each of the linear voltage regulators 20 and 22 includes an input terminal, an output terminal and ground terminal.

The input pin or terminal of the regulator 20 is connected to the 14 volt battery supply at line 24. The output pin or terminal of the regulator 20 is a 5 volt output over the output appearing on the ground pin or terminal. The ground terminal of the regulator 20 acts as a ground for the first electronic circuit 12. In other words, a voltage appearing on the ground terminal of the regulator 20 provides a reference potential for all of the components of the first electronic circuit 12. In like fashion, all of the circuit components in the electronic circuit 12 utilize the voltage from the output terminal of the regulator 20 as their supply voltage.

The output signal on the ground terminal of the regulator 20 also serves as a supply voltage appearing at the input terminal of the regulator 22. The ground pin or terminal of the regulator 22 serves as a ground reference for the second electronic circuit 14 and also serves as the battery return or ground at line 26.

The output pin or terminal of the regulator 22 provides a 5 volt supply voltage for the second electronic circuit 14. Consequently, the second electronic circuit 14 operates in a relatively conventional fashion.

Capacitors 28, 30, 32 and 34 operate as filters for the first and second regulators 20 and 22. The capacitor 28 is electrically connected between the input and ground terminals of the regulator 20 whereas the capacitor 30 is electrically connected between the output and ground terminals of the regulator 20. Preferably, the value of each of the capacitors is approximately 10 microfarads.

In like fashion, the capacitor 32 is electrically connected between the input and ground terminals of the regulator 22 and the capacitor 34 is electrically connected between the output and ground terminals of the regulator 22.

Assuming that the input-output voltage difference around the first and second regulators 20 and 22 is 6 volts, then the total power loss is $(14-6\times 2)\times$ the current. The total current is $14\div 2R=7\div R$. So the power loss is $14\div R$ watts.

In a parallel circuit configuration, for example one having only one regulator, the total current is $14\times 2\div R=28\div R$. The total drop-off voltage is $14-6=8$. So, for a parallel circuit, the total power loss is $8\times 22\div R=224\div R$. For a small R, the difference between $14\div R$ and $224\div R$ is substantial. For example, if $R=14$ ohms, then the power consumption is 16 times less with the serial regulator configuration of the present invention.

Because the system reference voltage of the first electronic circuit rides on the supply voltage of the second electronic circuit, the first electronic circuit 12 will be noisier than the second electronic circuit 14. Consequently, more filtering may be required at the input pin or terminal of the regulator 22 if the circuit becomes large.

By using two serial regulators such as the regulators 20 and 22, heat dissipation from the integrated circuit(s) which comprise the regulators can be reduced significantly. A large heat sink can be avoided. It is also possible to combine two integrated circuits of the regulators 20 and 22 as one to reduce parts count. If a complex digital circuit can be designed as two optically connected but electrically separated modules and if these two modules have a network-type interface, then a central power supply having the two serial regulators 20 and 22 of the present invention provides an efficient yet less noisy solution for products and circuits such as audio products and circuits of an automotive vehicle.

While the best mode for carrying out the invention has been described in detail, those familiar with the art to which this invention relates will recognize various alternative designs and embodiments for practicing the invention as defined by the following claims.

I claim:

1. In an automotive vehicle having a battery, a voltage regulator circuit for supplying a predetermined voltage to first and second optically connected and electrically separated digital electronic circuits, the voltage regulator circuit comprising:

a first linear regulator having input, output and ground terminals, the input terminal being adapted to be connected to the battery, the ground terminal providing a ground for the first electronic circuit and the output terminal being adapted for connection to the first electronic circuit for supplying the predetermined voltage to the first electronic circuit; and a second linear regulator having input, output and ground terminals, the input terminal of the second linear regulator being serially connected to the ground terminal of the first linear regulator, the ground terminal of the second linear regulator providing a ground for the second electronic circuit and a return for the battery and the output terminal of the second linear regulator being adapted for connection to the second electronic circuit for supplying the predetermined voltage to the second electronic circuit.

2. The voltage regulator circuit of claim 1 wherein the first and second electronic circuits have substantially the same load impedance.

3. The voltage regulator circuit of claim 1 further comprising a plurality of filters, one of the plurality of filters being connected between the input and ground terminals of each of the linear regulators and one of the plurality of filters being connected between the ground and output terminals of each of the linear regulators.

* * * * *